J. E. ROBINSON.
NUT LOCK.
APPLICATION FILED MAR. 9, 1907.
938,515.
Patented Nov. 2, 1909.
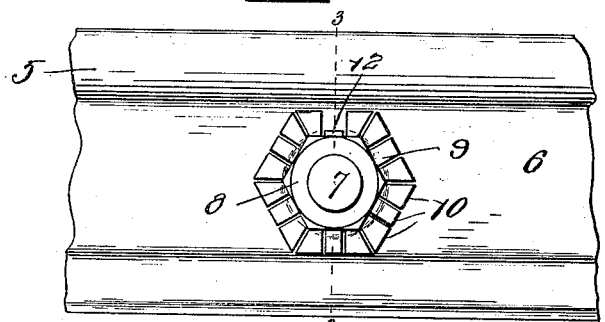
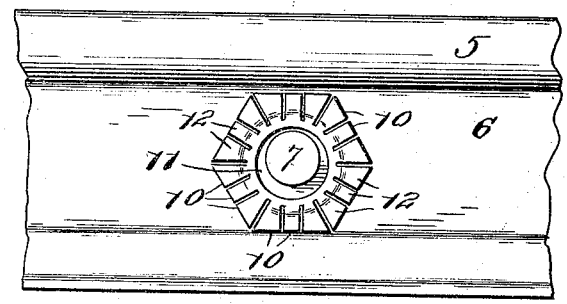
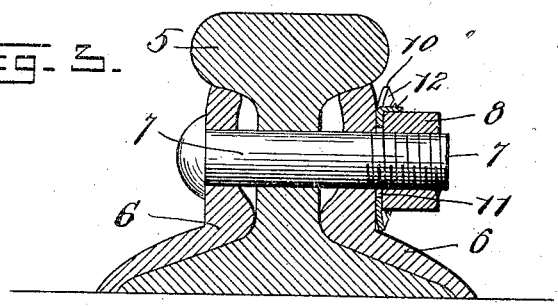
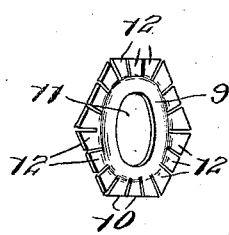
Witnesses
Inventor
Joseph E. Robinson
By
Attorney

UNITED STATES PATENT OFFICE.

JOSEPH E. ROBINSON, OF WHEELING, WEST VIRGINIA.

NUT-LOCK.

938,515.     Specification of Letters Patent.     Patented Nov. 2, 1909.

Application filed March 9, 1907. Serial No. 361,568.

*To all whom it may concern:*

Be it known that I, JOSEPH E. ROBINSON, a citizen of the United States, residing at Wheeling, in the county of Ohio and State of West Virginia, have invented certain new and useful Improvements in Nut-Locks, of which the following is a specification.

My invention relates to improvements in nut locks of the type employing a rotatable washer designed to come into a non-rotatable position when applied and to be bent into locking engagement with the nut.

The object of the invention is to provide a nut-locking washer of the above type, which will be simple and inexpensive, and suitable for application upon the bolts of railway joints without necessitating any change in the structure of the bolt and nut as now used, and at the same time provide for convenient removal at any time and for the indefinite use of the locking washer by a provision that will permit its use in a plurality of positions and without the necessity of removing the nut from the bolt.

To this end the invention consists in providing a washer with a surrounding series of outwardly extending tongues adapted to be bent into locking engagement with a nut and so formed as to present a series of peripheral sides or bases adapted to engage the base of a fish plate or an obstructing part on the bolted structure.

The invention also consists in certain novel features in the arrangement and construction of parts, all, as hereinafter described, and specifically set forth in the appended claims.

In the accompanying drawings; Figure 1. represents a portion of a rail and fish plate, and shows the application of the invention thereto. Fig. 2. is a view similar to Fig. 1., showing the nut removed. Fig. 3. is a transverse section view on line 3 of Fig. 1. Fig. 4. is a perspective view of the locking washer.

Referring to the drawings numeral 5 designates the rail, and 6 the fish plates, used at the rail joints, which are secured together by bolts and nuts such as the bolt 7 and nut 8, all these elements being of the commonly employed type.

Interposed between the fish plates 6 and the nut 8 is a washer 9 designed to take the place of the ordinary washer. This washer 9 is preferably of hexagonal form to present a plurality of sides or bases 10, and of such size as to cause it when applied, as shown, to bring one of these bases into engagement with the base or foot of the fish plate and be in parallelism therewith. The bolt opening 11 of the washer is of such size as to admit of the transverse adjustment of the washer on the bolt so that the base engagement may be readily effected with any side of the washer.

As shown the washer is slit so as to form of the part that projects beyond the nut a surrounding series of tongues 12, which are formed into groups in which the outer edges of the tongues in each group form the straight locking edge base 10, preferably three tongues for each edge base, one or more of which may be bent down, as shown in Figs. 1 and 3, into locking engagement with the nut, while by their multiplicity and the angular contour of the washer the locking tongues are designed to come into use to accommodate the various positions to which the washer may be changed. These tongues are preferably bent outward slightly from a point outside the portion forming the bearing of the nut, but these tongues form a part of the bearing portion in order that they will intersect the edge of the nut in any of its positions and be bent sharply against the edge of the same. When the washer is applied the tongues incline from the fish plate as shown in Fig. 3, which permits the insertion of an instrument for the purpose of initially bending down the tongues, when a hammer can then be employed.

From the foregoing it will be seen that a simple and effective provision is made for locking the nuts of rail joints and other devices, that can be changed to many positions for use according as the same may be required, as from the breaking of a locking tongue in removing a nut or from other conditions arising in its use.

What I claim is:

1. In a nut lock the combination with a bolt and its nut, of a locking washer adapted for transverse adjustment on said bolt, and slit from its outer edge to form a surrounding series of tongues adapted to be bent down on the nut, said tongues being formed into groups presenting each a straight locking edge, substantially as and for the purpose set forth.

2. In a nut lock, the combination with a bolt and its nut, of a washer transversely adjustable on the bolt and having a plurality of outwardly projecting tongues surrounding the same and forming surrounding groups each presenting a straight locking edge, said tongues being forwardly inclined from a point beyond the nut bearing portion of the washer, substantially as and for the purpose set forth.

3. In a nut lock, the combination with a bolt and its nut of a locking washer transversely adjustable on the bolt and having a plurality of locking tongues formed into surrounding groups, each presenting a straight locking edge, said tongues extending within the nut bearing portion of the washer and being inclined forwardly from a point outside said bearing portion, substantially as and for the purpose set forth.

In testimony whereof I affix my signature, in presence of two witnesses.

JOSEPH E. ROBINSON.

Witnesses:
W. J. LUKENS,
T. S. THOMAS, Jr.